United States Patent
Murphy et al.

(10) Patent No.: US 12,321,617 B2
(45) Date of Patent: **\*Jun. 3, 2025**

(54) UNAUTHORIZED MEMORY ACCESS MITIGATION

(71) Applicant: Lodestar Licensing Group LLC, Evanston, IL (US)

(72) Inventors: Richard C. Murphy, Boise, ID (US); Shivam Swami, Folsom, CA (US); Naveh Malihi, University City, MO (US); Anton Korzh, Boise, ID (US); Glen E. Hush, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,015

(22) Filed: Sep. 8, 2023

(65) Prior Publication Data

US 2024/0143196 A1 May 2, 2024

Related U.S. Application Data

(63) Continuation of application No. 17/665,307, filed on Feb. 4, 2022, now Pat. No. 11,755,210, which is a
(Continued)

(51) Int. Cl.
*G06F 3/06* (2006.01)

(52) U.S. Cl.
CPC .......... *G06F 3/0622* (2013.01); *G06F 3/0638* (2013.01); *G06F 3/0655* (2013.01); *G06F 3/0673* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 6,804,730 B1 10/2004 Kawashima
7,054,990 B1 5/2006 Tamura et al.
(Continued)

FOREIGN PATENT DOCUMENTS

WO 2017163204 9/2017

OTHER PUBLICATIONS

M. Yan and K. Gopalan, "Performance Overheads of Confidential Virtual Machines," 2023 31st International Symposium on Modeling, Analysis, and Simulation of Computer and Telecommunication Systems (MASCOTS), Stony Brook, NY, USA, 2023, pp. 1-8, doi: 10.1109/MASCOTS59514.2023.10387607. (Year: 2023).*
(Continued)

*Primary Examiner* — Daniel C. Chappell
(74) *Attorney, Agent, or Firm* — Brooks, Cameron & Huebsch, PLLC

(57) ABSTRACT

Apparatuses and methods related to mitigating unauthorized memory access are described. Mitigating unauthorized memory access can include verifying whether an access command is authorized to access a protected region of a memory array. The authorization can be verified utilizing a key and a memory address corresponding to the access command. If an access command is authorized to access a protected region, then a row of the memory array corresponding to the access command can be activated. If an access command is not authorized to access the protected region, then a row of the memory array corresponding to the access command may not be activated.

20 Claims, 5 Drawing Sheets

Related U.S. Application Data continuation of application No. 16/235,303, filed on Dec. 28, 2018, now Pat. No. 11,256,427.

(58) Field of Classification Search
CPC .............. G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 10,691,619 B1 | 6/2020 | Gibson et al. | |
| 11,256,427 B2* | 2/2022 | Murphy | G06F 3/0673 |
| 11,755,210 B2* | 9/2023 | Murphy | G06F 3/0688 |
| | | | 711/163 |
| 2003/0133330 A1 | 7/2003 | Pekny | |
| 2004/0236919 A1 | 11/2004 | Okaue et al. | |
| 2004/0255145 A1 | 12/2004 | Chow | |
| 2005/0177867 A1 | 8/2005 | Toutonghi | |
| 2007/0038828 A1* | 2/2007 | De Santis | G11C 16/22 |
| | | | 711/163 |
| 2007/0157029 A1 | 7/2007 | Mani | |
| 2007/0274284 A1* | 11/2007 | Dendukuri | H04L 43/00 |
| | | | 370/351 |
| 2008/0244208 A1 | 10/2008 | Narendra et al. | |
| 2009/0241200 A1* | 9/2009 | Li | G06F 12/1466 |
| | | | 711/E12.094 |
| 2009/0249014 A1* | 10/2009 | Obereiner | G06F 12/1441 |
| | | | 711/163 |
| 2012/0079190 A1 | 3/2012 | Colgrove et al. | |
| 2013/0246718 A1 | 9/2013 | Ono | |
| 2014/0006704 A1 | 1/2014 | Greenfield et al. | |
| 2014/0136806 A1 | 5/2014 | Rudelic et al. | |
| 2014/0137271 A1* | 5/2014 | Hyde | G06F 21/78 |
| | | | 726/30 |
| 2014/0156923 A1* | 6/2014 | Bains | G11C 11/40611 |
| | | | 711/106 |
| 2014/0177370 A1 | 6/2014 | Halbert et al. | |
| 2014/0179254 A1 | 6/2014 | Lai et al. | |
| 2014/0181454 A1* | 6/2014 | Manula | G06F 12/1027 |
| | | | 711/170 |
| 2014/0189228 A1 | 7/2014 | Greenfield et al. | |
| 2015/0095662 A1 | 4/2015 | Jejurikar et al. | |
| 2015/0179254 A1 | 6/2015 | Alrod et al. | |
| 2015/0301761 A1 | 10/2015 | Sijstermans et al. | |
| 2016/0098201 A1 | 4/2016 | Kim et al. | |
| 2016/0314826 A1 | 10/2016 | Augustine et al. | |
| 2017/0060782 A1 | 3/2017 | Chinnakkonda Vidyapoornachary et al. | |
| 2017/0124358 A1 | 5/2017 | Krithivas et al. | |
| 2017/0329542 A1 | 11/2017 | Chou et al. | |
| 2018/0107608 A1 | 4/2018 | Kaplan et al. | |
| 2019/0303305 A1 | 10/2019 | Mesropian | |
| 2020/0372164 A1* | 11/2020 | Raju | G06F 21/6218 |

OTHER PUBLICATIONS

J. Seo, M. Kayondo, J. Kang, K. Lee, D. Kwon and Y. Paek, "ROSec: Intra-Process Isolation for ROS Composition With Memory Protection Keys," in IEEE Transactions on Automation Science and Engineering, doi: 10.1109/TASE.2024.3525050. (Year: 2024).*

International Search Report and Written Opinion for related PCT Application No. PCT/US2019/064903, dated Mar. 26, 2020, 11 pages.

* cited by examiner

UNAUTHORIZED MEMORY ACCESS MITIGATION

PRIORITY INFORMATION

This application is a Continuation of U.S. application Ser. No. 17/665,307, filed Feb. 4, 2022, which will issue as U.S. Pat. No. 11,755,210 on Sep. 12, 2023, which is a Continuation of U.S. application Ser. No. 16/235,303, filed Dec. 28, 2018, which issued as U.S. Pat. No. 11,256,427 on Feb. 22, 2022, the specification of which is incorporated herein by reference.

TECHNICAL FIELD

The present disclosure relates generally to memory, and more particularly to apparatuses and methods associated with protecting memory using a key.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). For various reasons, it can be desirable to prevent unauthorized access to memory (e.g., via read and/or write operations) or particular portions thereof. For instance, a memory system may store sensitive data (e.g., data desired to be kept secret, such as passwords, personal information, etc.).

DETAILED DESCRIPTION

Figure 1:
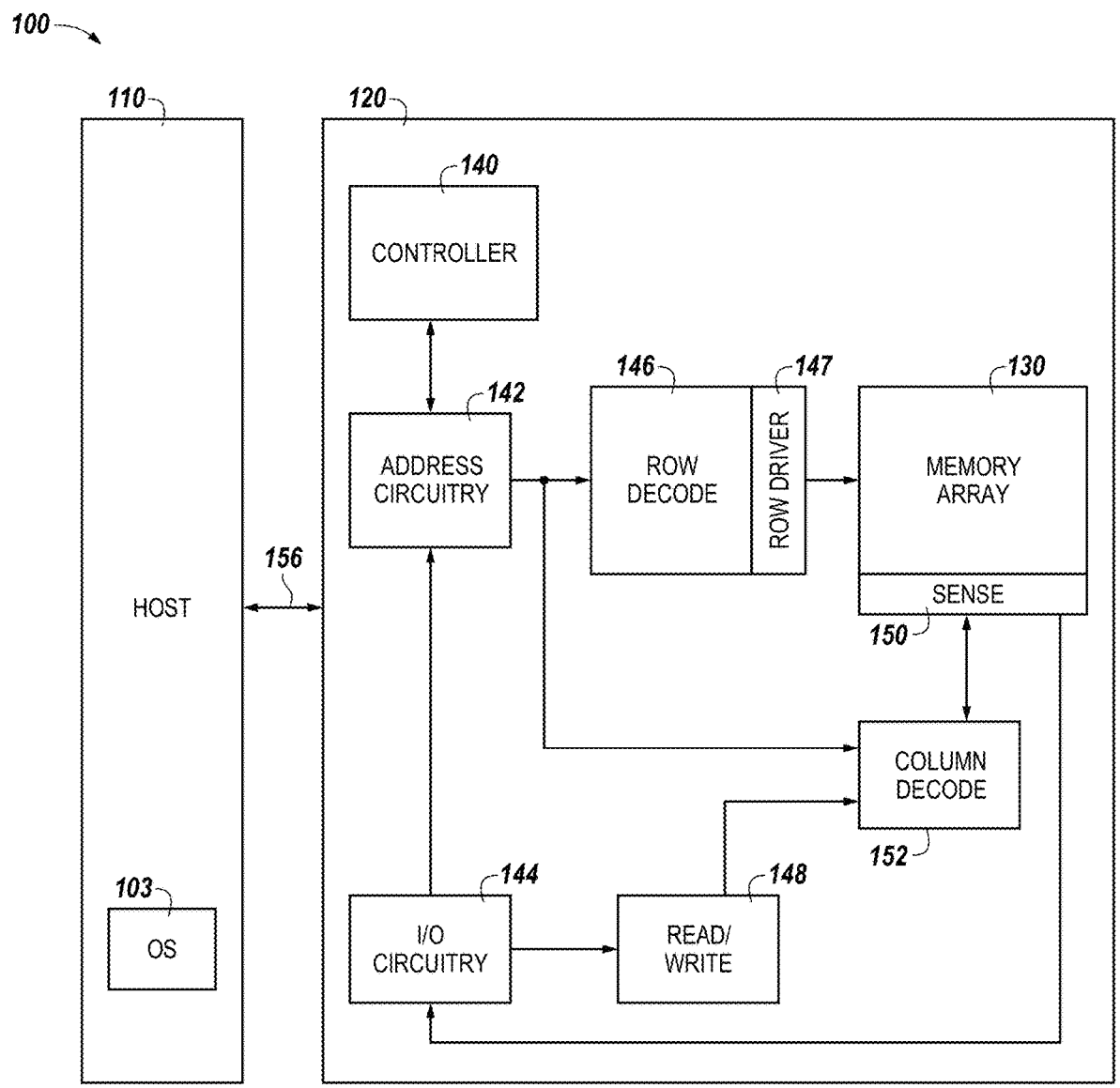
FIG. 1 is a block diagram of an apparatus in the form of a computing system including a memory device in accordance with a number of embodiments of the present disclosure.

The present disclosure includes apparatuses and methods related to mitigating unauthorized memory access. Access commands can be provided from a host to a memory device. The memory device may rely on the host for implementing security measures to prevent unauthorized access to the memory device. However, implementing security measures at the memory device may further improve security and may mitigate unauthorized memory accesses.

In prior approaches the host can manage keys used to access a memory device. That is, in prior approaches a memory device does not manage keys used to access protected regions of a memory array of the memory device.

In various embodiments, a memory device can mitigate unauthorized memory accesses by verifying access commands as authorized utilizing credentials provided along with, or as part of, the access commands. The credentials can be stored in a plurality of registers implemented in the memory device prior to receipt of the access command (e.g., from a host). As used herein, an access command can include one or more sub-commands. For example, an access command can include a pre-charge command, an activate command, a read command, and/or a write command, among other possible commands.

The authorization of an access command can be verified utilizing a key (e.g., credential(s)). The access command can request access to an address and/or a plurality of addresses. The memory device can determine whether the address is locked or unlocked based on a security mode associated with the address. If the address is locked, then the memory device can refrain from providing access to the address unless a key associated with the access command is also provided to the memory device. The key can be verified against a stored key to determine whether to unlock the address.

If the key matches the stored key, then the memory device can unlock the address and can provide access to the address(es). If the key does not match the stored key, then the memory device can refrain from providing access to the address(es).

Implementing security measures at a memory device to prevent unauthorized access can increase the security of the memory device beyond the security which may be provided by a host. For example, unauthorized access commands may be prevented from accessing the memory device by security measures implemented at a host as well as by security measures implemented at a memory device.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory device 120 in accordance with a number of embodiments of the present disclosure. As used herein, a memory device 120, a memory array 130, and/or host 110 might also be separately considered an "apparatus."

In this example, system 100 includes a host 110 coupled to memory device 120 via an interface 156. The computing system 100 can be a personal laptop computer, a desktop computer, a digital camera, a mobile telephone, a memory card reader, or an Internet-of-Things (IoT) enabled device, among various other types of systems. Host 110 can include a number of processing resources (e.g., one or more processors, microprocessors, or some other type of controlling circuitry) capable of accessing memory 120. The system 100 can include separate integrated circuits, or both the host 110 and the memory device 120 can be on the same integrated circuit. For example, the host 110 may be a system controller of a memory system comprising multiple memory devices 120, with the system controller 110 providing access to the respective memory devices 120 by another processing resource such as a central processing unit (CPU).

In the example shown in FIG. 1, the host 110 is responsible for executing an operating system (OS) 103 and/or various applications that can be loaded thereto (e.g., from memory device 120 via controller 140). The host 110 may not be responsible for managing keys or addresses that define the protected region. The host 110 can provide access commands and/or security mode initialization commands to a memory device via the interface 156. In some examples, the memory device may provide an indication of an unauthorized access attempt. In various embodiments, the unauthorized access attempt can result in providing data to the host such that the issuer of the unauthorized access attempt is not notified of the memory device's identification of the unauthorized access attempt. The data received from the memory device 120 may not be the data stored by the memory cells having the address provided by the access command. The host 110 may receive data generated responsive to identifying the access command as unauthorized.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines (which may be referred to herein as digit lines or data lines). Although a single array 130 is shown in FIG. 1, embodiments are not so limited. For instance, memory device 120 may include a number of arrays 130 (e.g., a number of banks of DRAM cells).

The memory device 120 includes address circuitry 142 to latch address signals provided over an interface 156. The interface can include, for example, a physical interface employing a suitable protocol (e.g., a data bus, an address bus, and a command bus, or a combined data/address/command bus). Such protocol may be custom or proprietary, or the interface 156 may employ a standardized protocol, such as Peripheral Component Interconnect Express (PCIe), Gen-Z, CCIX, or the like. Address signals are received and decoded by a row decoder 146 and a column decoder 152 to access the memory array 130. Data can be read from memory array 130 by sensing voltage and/or current changes on the sense lines using sensing circuitry 150. The sensing circuitry 150 can comprise, for example, sense amplifiers that can read and latch a page (e.g., row) of data from the memory array 130. The I/O circuitry 144 can be used for bi-directional data communication with host 110 over the interface 156. The read/write circuitry 148 is used to write data to the memory array 130 or read data from the memory array 130. As an example, the circuitry 148 can comprise various drivers, latch circuitry, etc.

Controller 140 decodes signals provided by the host 110. These signals can include chip enable signals, write enable signals, and address latch signals that are used to control operations performed on the memory array 130, including data read, data write, and data erase operations. In various embodiments, the controller 140 is responsible for executing instructions from the host 110. The controller 140 can comprise a state machine, a sequencer, and/or some other type of control circuitry, which may be implemented in the form of hardware, firmware, or software, or any combination of the three.

In accordance with various embodiments, the controller 140 can be configured to decode a security mode initialization command received thereto. The security mode initialization command can be received from the host 110. The security mode initialization command can be provided to the memory device 120 to set a security mode of the memory device 120 and/or to designate one or more protected regions of the memory device 120. A security mode can include a locked mode and an unlocked mode. The memory device 120 can be configured to provide access to a protected region of the memory array 130 if the memory device 120 is in an unlocked mode or to prevent access to the protected region of the memory array 130 if the memory device 120 is in a locked mode.

The OS 103, as executed by the host 110, can initialize the security mode initialization command to store a key and an address or a range of addresses of the memory array 130 in one or more registers of the controller 140. The stored key and address can define the protected region of the memory array 130. The OS 103 can initialize the security mode initialization command during an initialization of the OS 103 or a time after the OS 103 is initialized.

The address received form the host 110 can be a logical address. A logical address can be translated, mapped, or resolved to a physical address. A logical address can include a virtual address, for example. The physical address may be used by the memory device 130 to access data from a memory array 130. The physical address can be directly mapped to a memory cells or row of the memory array 130. The logical address corresponding to the initialization command and/or access commands and received from the host 110 can be translated by the memory device 120 to generate the physical address. The physical address can be a physical row address of the memory array 130.

The key can be a security token used to gain access to a protected region of the memory array 130. The key can be encrypted or unencrypted. The key can be provided by the OS 103 and used by the OS 103 to access the protected region of the memory array 130. The key can be unique to a protected region of memory and/or can be associated with a plurality of protected regions of memory. As described further below, the key can comprise one or more bits which can be stored in one or more registers of the memory device 120.

The protected region of the memory array 130 describes a region of the memory array 130 that is protected using the key. The protected range can be defined by a first memory address and a second memory address. The first memory address can be a starting address and the second memory address can be an ending address. In some examples, the protected range is stored as a starting address and as an offset. The offset together with the starting address can be used to generate the ending address. The protected region can be continuous from the starting address to the ending address.

In some examples, the memory array 130 can comprise one or more protected regions. Each of the protected regions can be defined using a starting address and an offset. Each of the starting addresses corresponding to a different protected region can be unique and/or can be a same starting address. Each of the offsets can also be a same offset or a different offset.

In various instances, the host 110 can provide an access command to the memory device 120. The access command can be provided to access a protected region of the memory device 120. The access command can be associated with an address or a range of addresses and a key. The memory device 120 can compare the provided address to a protected range to determine whether the address is within the protected range. If the address is within the protected range, the memory device 120 can compare the key with a stored key to determine whether the key and the stored key match. If the key matches the stored key, then the memory device can enter an unlocked mode from a locked mode. The memory device 120 can, via the controller 140, enable a row driver to activate a row of the memory array 130 corresponding to the address (e.g., protected region). If the key does not match, the memory device 120 can, via the controller 140, prevent access to the protected region by preventing enablement of the row driver 147 of the memory array 130, thus preventing activation of a row corresponding to the access command.

Figure 2:
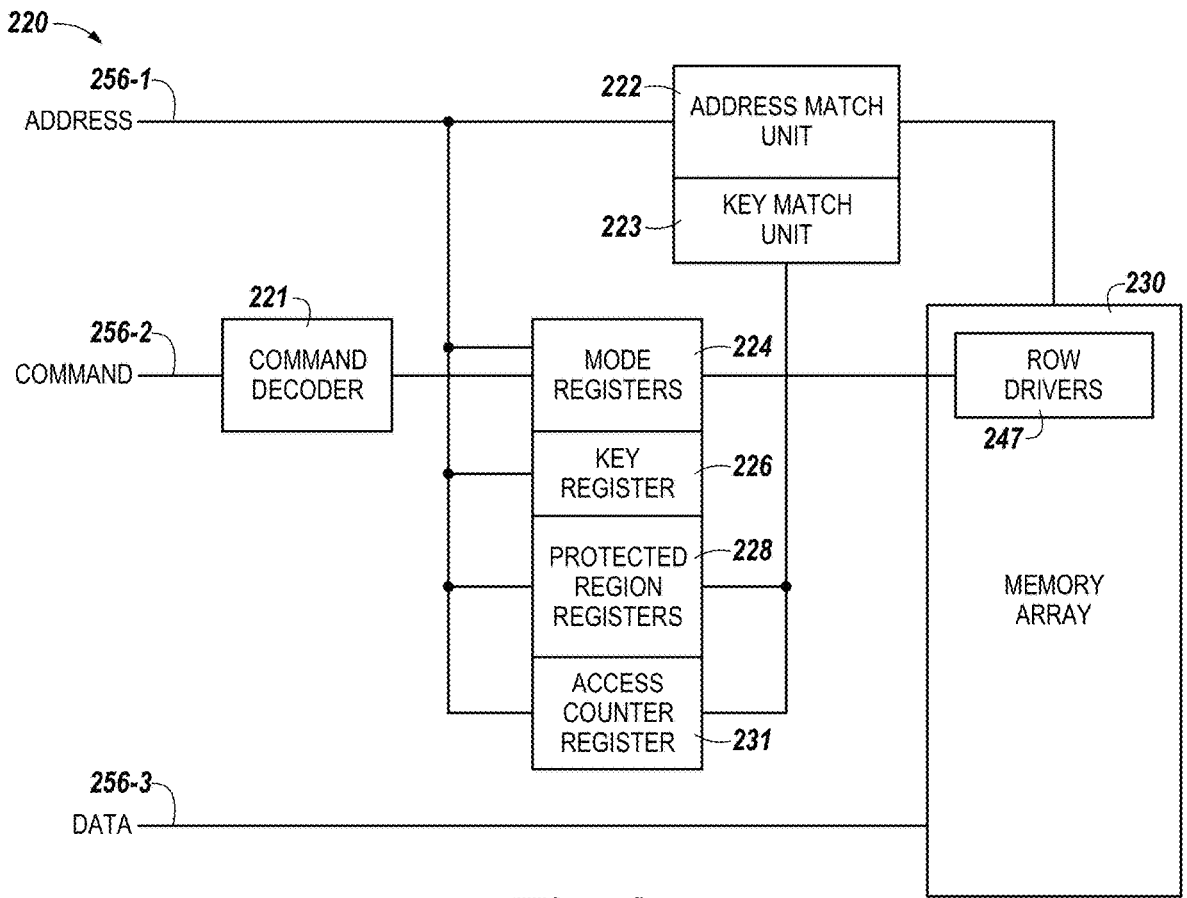
FIG. 2 is a block diagram of an apparatus in the form of a memory device including a memory array and portions of a controller capable of protecting regions of memory using a key in accordance with a number of embodiments of the present disclosure.

FIG. 2 is a block diagram of an apparatus in the form of a memory device 220 including a memory array 230 and portions of a controller capable of protecting regions of memory using a key in accordance with a number of embodiments of the present disclosure. The memory device 220 is analogous to memory device 120 in FIG. 1. The memory device 220 includes the memory array 230 and portion of the controller 140 in FIG. 1.

The controller can include a command decoder 221, mode registers 224, a key register 226, protected region registers 228, and an access counter register 231. The controller can also include the address match unit 222 and a key match unit 223.

In this example, the interface (e.g., 156 shown in FIG. 1) comprises an address bus 256-1, a command bus 256-2, and a data bus 256-3. The device 220 can receive the security mode initialization command and/or access commands along with keys via the command bus 256-2. The device 220 can receive addresses via the address bus 256-1, and data can be provided to/from the device 220 via the data bus 256-3.

A host can provide, via the command bus 256-2, the security mode initialization command to initialize a security mode of the memory device 220. The memory device 220 can receive the security mode initialization command at the command decoder 221. The command decoder 220 can decode the security mode initialization command.

In some examples, the security mode initialization command can be associated with a key and a number of addresses received via the command bus 256-2 and the address bus 256-1.

The controller can store a key in the key register 226 and can store the one or more addresses in the protected region registers 228. Each of the mode registers 224, the key registers 226, the protected region registers 228, and/or the access counter register 231 can be comprised of one or more registers.

The one or more addresses can be stored in the protected region registers 228 as a starting address and an offset. The starting address can be stored in a first register of the protected regions registers 228 and the offset can be stored in a second register of the protected region registers 228. The starting address and the ending address can define a region of the memory array 230. As such, the region to protect (e.g., protected region) can be stored in the protected region register 228.

The key can be stored in the key register 226. In some examples, a plurality of keys can be stored in one or more key registers including the key register 226. Each of the plurality of keys can be associated with a different one of the plurality of protected regions stored in the protected region registers including the protected region register 228. The plurality of keys can be used to allow access to the protected regions. For example, a first key can be used to allow access to a first protected region and a second key can be used to allow access to a second protected region.

Responsive to storing the key in the key register 226 and the address in the protected region register 228, the controller can change a security mode of the memory device 220 from an unlocked mode to a locked mode in the mode registers 224. The mode registers 224 can include a security mode register. The security mode register can store a first value representing an unlocked mode or a second value representing a locked mode, among other possible modes. The locked mode can be used to prevent access to a protected region of the memory array 230. An unlocked mode can be used to allow access to a protected region of the memory array 230.

In some examples, responsive to receipt of the security mode initialization command, the controller can set an access counter register 231. For example, the access counter register 231 can be set to zero. The access counter register 231 can provide a count of access commands directed to the protected region of the memory array 230 (e.g., as defined by protected region register 228).

The controller can also process access commands. For example, an access command received via the command bus 256-2 can be decoded by the command decoder 221. The address match unit 222 can receive an address corresponding to the access command at the address match unit 222 of the controller. The address match unit 222 can determine whether the received address is within a protected region (e.g., as stored in the protected region register 228).

If the received address is in a protected region, then the controller, via the key match unit 223, can determine whether the key associated with the access command matches a key stored in the key register 226. If the key associated with the access command matches the key stored in the key register 226, then the controller can modify the mode registers 224 from a locked mode to an unlocked mode.

The controller can provide a signal to the row drivers 247 to activate a row corresponding to the received address if the mode registers 224 reflect an unlocked mode. The controller can prevent a signal from being provided to the row drivers 247 if the mode registers 224 reflect a locked mode. Although the row drivers 247 are shown as being in the memory array 230, the row drivers 247 can also be implemented externally to the memory array 230 as shown in FIG. 1.

The controller can also include the access counter register 231. The access counter register can store a count corresponding to a quantity of access commands received at the memory device 220, where the access commands are associated with an address in the protected region. Prior to allowing access, by the access commands, to the array 230, the controller can determine whether the access count stored in the access counter register 231 is greater than a threshold. If the access count is greater than the threshold, then the controller can refrain from allowing access to the address corresponding to an access command. If the access count is less than the threshold, then the controller may allow access to the address provided that the address is in a protected region and that the key corresponding to the access command matches a key stored in the protected region register 228.

The controller can determine whether the access count is greater than a threshold before it is determined whether the address is in the protected region, before it is determined whether the key associated with the access command matches the key stored in the key register 226, and/or after it is determined whether the key associated with the access command matches the key stored in the key register 226.

The controller can determine whether the access count is greater than the threshold to protect against row hammer attacks, for example. Row hammer attacks access memory cells of the memory array 230 to leak the charge stored in the memory cells among themselves to change the content of nearby memory cells. By preventing access to memory cells above a threshold, the controller can protect against row hammer attacks. In some examples, the controller can report any unauthorized access attempt to the protected region. The threshold can be used to determine when to report each of the unauthorized access attempts logged before the threshold is reached.

Figure 3:
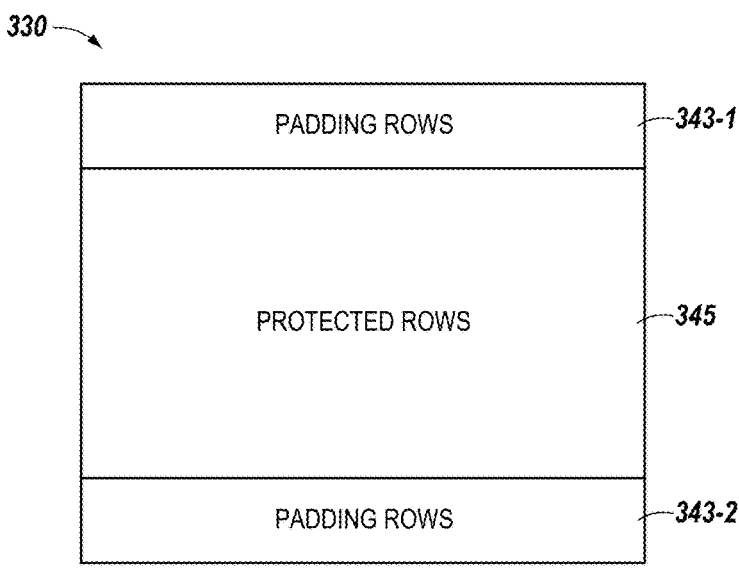
FIG. 3 is a block diagram of a region of a memory array in accordance with a number of embodiments of the present disclosure.

FIG. 3 is a block diagram of a region of a memory array 330 in accordance with a number of embodiments of the present disclosure. The protected region of the memory array can comprise protected rows 345 and/or padding rows 343-1 and 343-2.

In some examples, the controller can add the padding rows 343-1 and/or 343-2 to the protected rows 345. The protected row can correspond to a protected region defined by the security mode initialization command. The memory addresses associated with the security mode initialization command can correspond to the protected rows 345. The controller can pad the protected region by adding the padding rows 343-1 and 343-2 to the protected rows 345 to generate the padded protected region.

The padding rows 343-1 and 343-2 can be added to the protected rows 345 to protect against row hammer attacks. The padding rows 343-1- and 343-2 can be utilized in conjunction with the access counter of the padded protection region to protect the protected rows 345 from unauthorized memory access utilizing row hammer attacks, for example.

Figure 4:
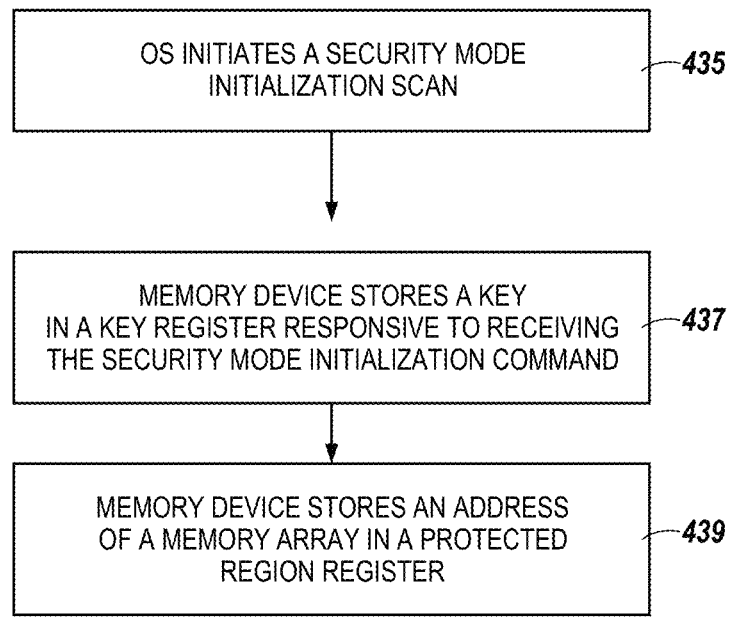
FIG. 4 illustrates an example flow diagram of a method for processing a security mode initialization command in accordance with a number of embodiments of the present disclosure.

FIG. 4 illustrates an example flow diagram of a method for processing a security mode initialization command in accordance with a number of embodiments of the present disclosure. At 435, an OS can initiate a security mode initialization command. The security mode initialization command can be provided by the OS to define a protected region of a memory array and to associate a key with the protected region.

Defining a protected region utilizing the security mode initialization command provides the OS flexibility. The OS can have flexibility to define the size and content of a protected region of the memory array. For example, the OS can define the protected region as comprising a first size or a second size, among a number of other sizes. The OS can activate a security mode by providing the security mode initialization command or can refrain from activating the security mode by refraining from providing the security mode initialization command to the memory device.

A memory device can function in a security mode or without the security mode based on the OS's selection. Further, the OS can define a size or location of the protected region after the protected region has been initialized. For example, after initialization of a security mode, the OS can increase the size of the protected region or decrease the size of the protected region. After initialization of a security mode, the OS can also change a base address of the protected region and/or an offset of the protected region. The OS can also exit the security mode after the memory device has been placed in the security mode. For example, the OS can store a predefined value in the protected region registers. The OS can store a zero as a base address and/or an offset of the protected region to exit the security mode.

The OS can utilize an application programming interface (API) to generate the security mode initialization command and/or an access command used to define and/or access a protected region of the memory array. The OS can comply with the security features of the memory device utilizing the API.

In some examples, the security mode initialization command can be generated by the OS and/or received by the memory device as part of an initialization process of a computing device and/or the OS. At 437, the memory device can store a key in a key register responsive to receiving the security mode initialization command. At 439, the memory device can store an address of a memory device in a protected region register. The memory device can set a mode register based on the storing of the key and/or the storing of the address. The mode register can identify whether region of the memory array is protected. The memory device can set the mode register to a locked mode. The locked mode can be a protected mode.

Figure 5:
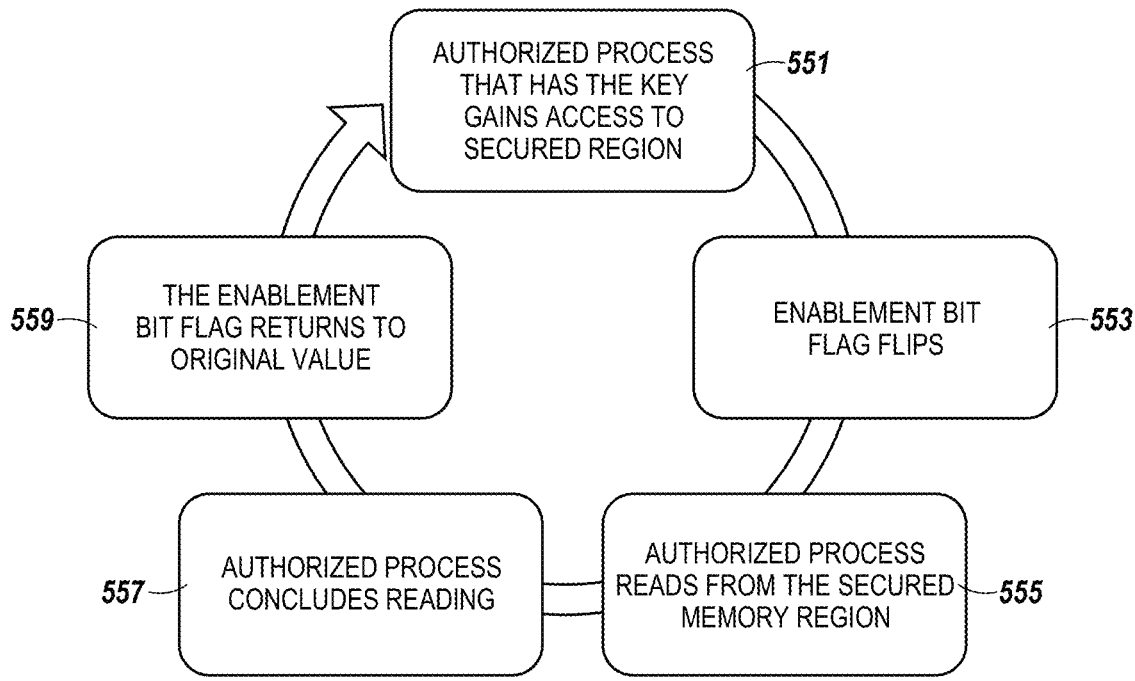
FIG. 5 illustrates an example flow diagram of a method for accessing a protected region of a memory array in accordance with a number of embodiments of the present disclosure.

FIG. 5 illustrates an example flow diagram of a method for accessing a protected region of a memory array in accordance with a number of embodiments of the present disclosure. At 551, the authorized process that has the key gains access to the security region. The process can be an instance of a program that is being executed by the host such as an application process. For example, the process can be an OS and/or a different application, among other possible processes. The process can be authorized upon verifying that a key associated with an access command provided by the process matches a stored key in the key register.

At 553, the enablement bit flag can be flipped. The enablement bit flag can be stored in a security mode register show in FIG. 2 as one of the mode registers 224. The enablement bit flag can be flipped from a locked mode to an unlocked mode. At 555, the authorized process can read from the secured memory region. An access command can be a read command or a write command, among other possible access commands. The controller can prevent enabling a row driver from activating a row responsive to the enablement bit flag indicating the locked mode, where the row corresponds to a received address associated with the access command. For example, the controller can prevent any row driver enablement when the mode bit indicated that a secured memory region is locked.

At 557, the authorized process can conclude reading from the protected region. At 559, the controller can return the enablement bit flag to its original value. For example, the enablement bit flag can be returned to a locked mode.

Figure 6:
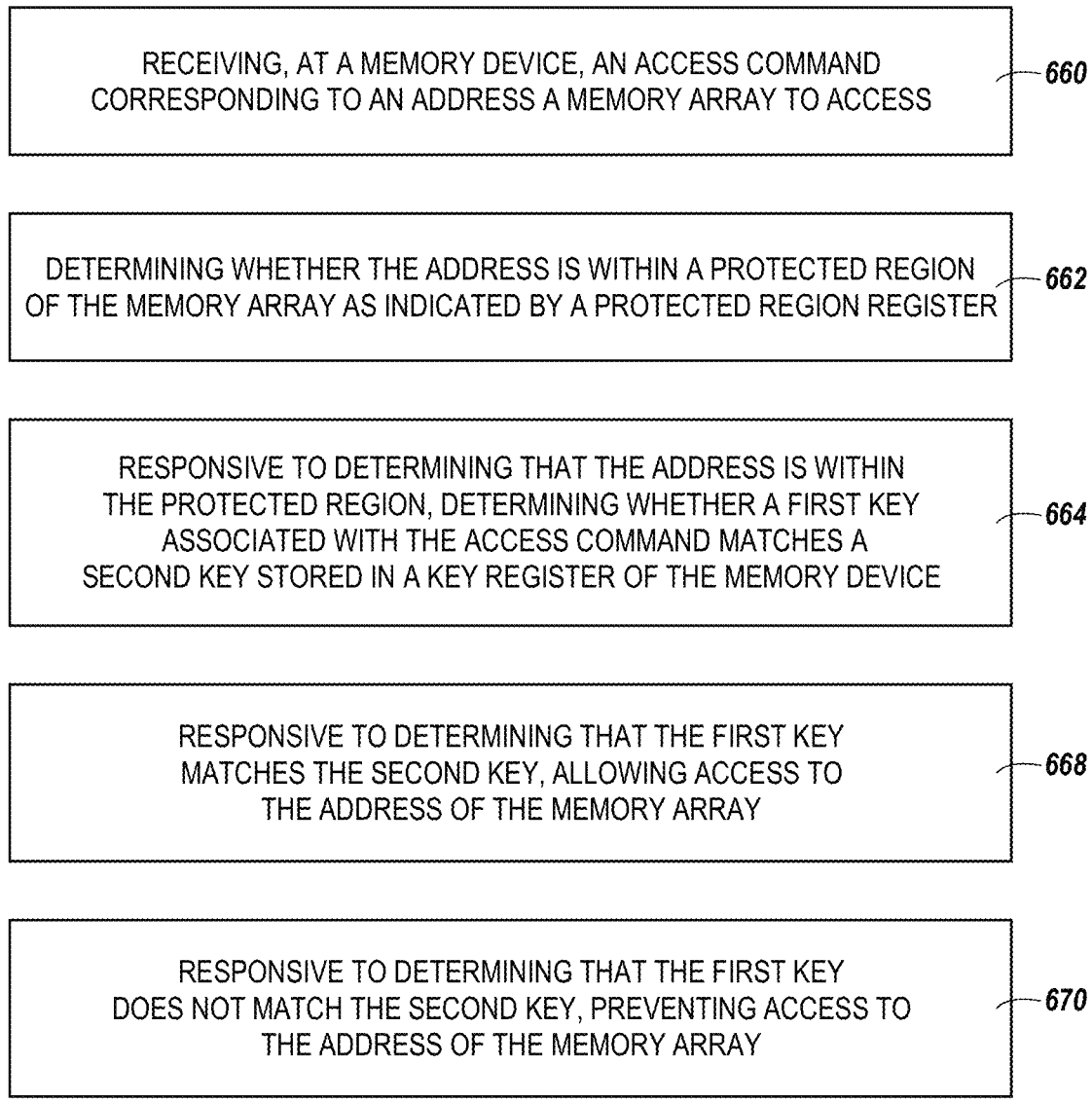
FIG. 6 illustrates an example flow diagram of a method for accessing a protected region of a memory array in accordance with a number of embodiments of the present disclosure.

FIG. 6 illustrates an example flow diagram of a method for accessing a protected region of a memory array in accordance with a number of embodiments of the present disclosure. The method can be executed by a memory device of a computing system.

At 660, a memory device can receive an access command corresponding to an address of a memory array to access. At 662, a determination can be made as to whether the address is within a protected region of the memory arrays as indicated by a protected region register. The address can be within the protected region if the address is greater than a starting address of the protected region but less than the ending address of the protected region. In some examples, the access command can be associated with a plurality of addresses to access. The plurality of addresses can be within the protected region if at least one of the plurality of addresses is greater than a starting address and at least one of the of the plurality of addresses is less than the ending address of the protected region.

At 664, responsive to determining that the address is within the protected region, the controller can determine whether a first key associated with the access command matches a second key stored in a key register of the memory device. The first key can match the second key if the first key is equal to the second key or if the first key is substantially equal to the second key. The first key can match the second key if the second key can be derived from the first key, among other examples.

At 668, responsive to determining that the first key matches the second key, the controller can allow access to the address of the memory array. The memory device can allow access to the address by providing the data stored at memory cells having the address to the host. Access can be allowed by allowing an activation of a row of the array corresponding to the address. The method can further allow activation of a row to which the address corresponds by switching an access enable flag from a first state to a second state, wherein rows corresponding to addresses within the protected region are not activatable unless the access enable flag is in the second state. Subsequent to execution of the access command (e.g., read command), the access enable flag can be returned to the first state to prevent activation of rows corresponding to the protected region.

At 670, responsive to determining that the first key does not match the second key, the controller can prevent access to the address of the memory array. Responsive to determining that the address is outside the protected region, allowing access to the address without performing a key match comparison.

In some examples, the access command can be a read command. Responsive to determining that the address is within the protected region and that the first key does not match the second key, the method may further comprise returning data read from a row corresponding to a different address of the array. In some embodiments, the first key and the address can be provided in a same cycle as a cycle in which the access command is received. In other embodiments, the first key and the address can be provided in a different cycle as a cycle in which the access command is received.

Figure 7:
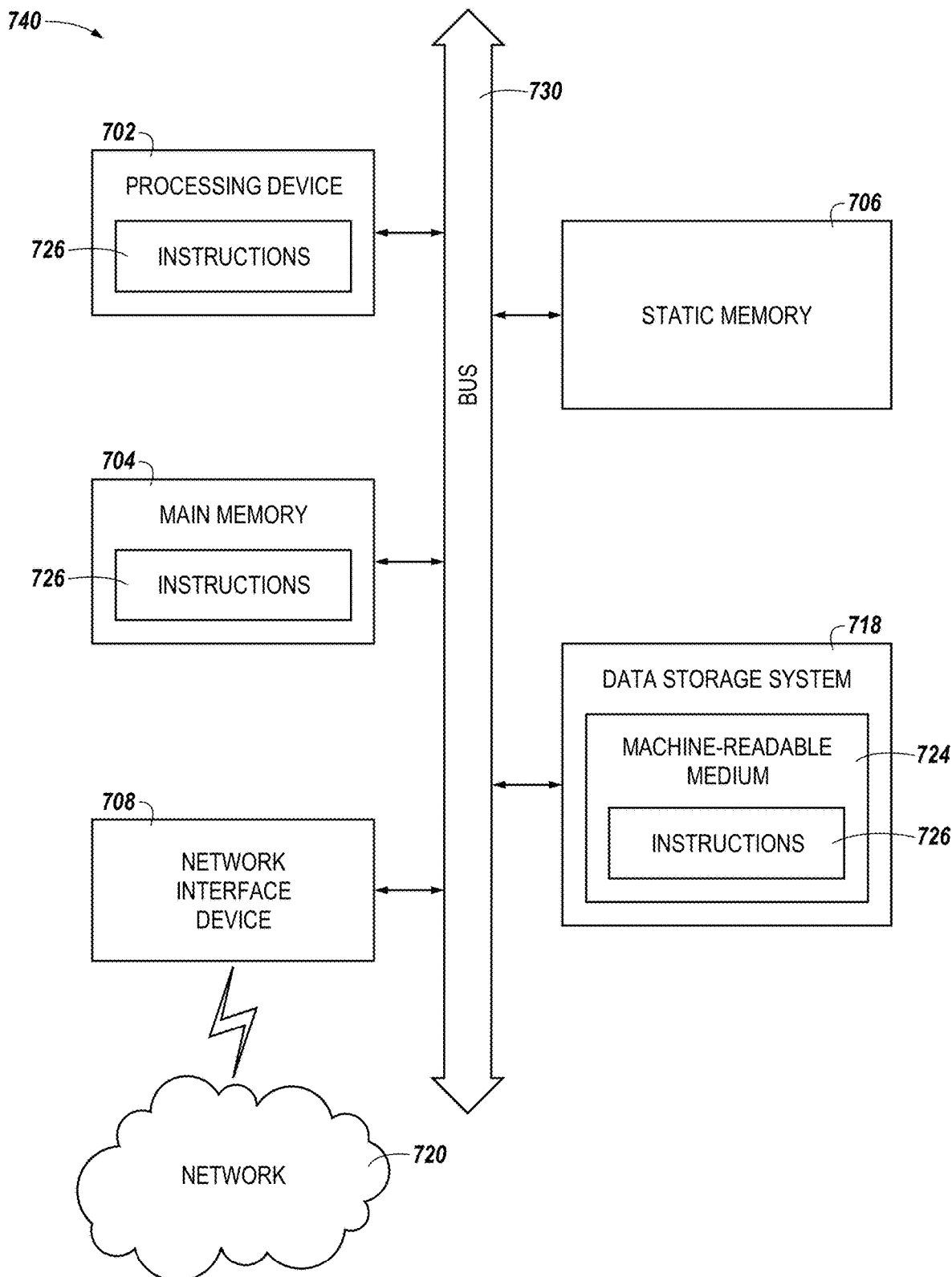
FIG. 7 illustrates an example machine of a computer system within which a set of instructions, for causing the machine to perform any one or more of the methodologies discussed herein, can be executed.

FIG. 7 illustrates an example machine of a computer system 740 within which a set of instructions, for causing the machine to perform any one or more of the methodologies discussed herein, can be executed. In some embodiments, the computer system 740 can correspond to a host system (e.g., the system 110 of FIG. 1) that includes, is coupled to, or utilizes a memory sub-system (e.g., the memory device 120 of FIG. 1) or can be used to perform the operations of a controller (e.g., the controller 140 of FIG. 1, including the register 224, 226,228, and 231 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 740 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 740 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 740, the main memory 704 and the processing device 702 also constituting machine-readable storage media.

In one embodiment, the instructions 726 include instructions to implement functionality corresponding to the controller 140 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory array;
a key register configured to store a first key used to determine whether access commands are allowed access to a protected region of the memory array;
a protected region register configured to store addresses defining the protected region;
an access count register to store an access count;
a mode register; and
control circuitry configured to:
responsive to receiving a security mode initialization command from a host:
store the first key in the key register;
store a first address corresponding to the memory array in the protected region register, wherein the first address is a protected address and the first key corresponds to the protected address;
responsive to storing the first key and storing the first address, set the mode register to a locked mode;
responsive to determining that the mode register is in the locked mode, determine whether a second address corresponding to an access command is within the protected region and determine whether a second key from a number of keys corresponding to the access command from a number of access commands matches the first key stored in the key register, wherein each key of the number of keys is provided with a different access command of the number of access commands;
responsive to determining that the second address is within the protected region and that the second key matches the first key, allow access to the second address based on a determination the access count is less than a threshold; and
responsive to allowing access to the second address, increment the access count register and enable a row driver;
reset the access count register responsive to a lapse of time without receiving additional access commands to the protected region.

2. The apparatus of claim 1, wherein the controller comprises access count register count registers configured to store the access count.

3. The apparatus of claim 2, wherein the controller is configured to, responsive to receiving the security mode initialization command, setting the access count registers to a predefined value.

4. The apparatus of claim 2, wherein the controller is further configured to, responsive to receiving the security mode initialization command, setting the access count registers to a 0-value such that the access count is set to a 0-value.

5. The apparatus of claim 4, wherein the access count provides a count of access commands directed to the protected region.

6. The apparatus of claim 1, wherein the first address includes an address of padding rows to the protected region.

7. The apparatus of claim 6, wherein the access count provides a count of access commands to the padding rows.

8. A method comprising:
receiving, at a memory device, an access command corresponding to an address of a memory array to access;
incrementing an access count stored in an access count register wherein the access count includes a quantity of access commands to the address in a protected region received at the memory device;
responsive to determining that a mode register of the memory device is in a locked mode, determining whether the address is within the protected region of the memory array as indicated by a protected region register;
responsive to determining that the address is within the protected region, determining whether a first key, from a number of keys, associated with the access command, from a number of access commands, matches a second key stored in a key register of the memory device, wherein each of the number of keys are provided with a different one of the number of access commands;

responsive to determining that the first key matches the second key, determining that the access count is less than a threshold;

responsive to determining that the access count is less than the threshold, allowing access to the address of the memory array by enabling a row driver of the memory device;

responsive to determining that the first key does not match the second key, preventing access to the address of the memory array by preventing enablement of the row driver of the memory device; and resetting the access count register responsive to a lapse of time without receiving additional access commands to the protected region.

9. The method of claim 8, further comprising receiving the access command, the address, and the first key from a host to which the memory device is coupled via an interface.

10. The method of claim 8, wherein allowing access to the address of the memory array further comprises allowing an activation of a row of the array corresponding to the address.

11. The method of claim 8, further comprising, responsive to determining that the address is outside the protected region, allowing access to the address without performing a key match comparison.

12. The method of claim 8, wherein the access command is a read command, and wherein allowing access to the address of the memory array comprises:

allowing activation of a row to which the address corresponds by switching an access enable flag from a first state to a second state, wherein rows corresponding to addresses within the protected region are not activatable unless the access enable flag is in the second state; and subsequent to execution of the read command, returning the access enable flag to the first state to prevent activation of rows corresponding to the protected region.

13. The method of claim 8, wherein the access command is a read command, and wherein, responsive to determining that the address is within the protected region and that the first key does not match the second key, the method further comprises returning data read from a row corresponding to a different address of the array.

14. The method of claim 8, wherein the method includes providing the first key and the address in a same cycle as a cycle in which the access command is received.

15. The method of claim 8, wherein the method includes providing at least one of the first key or the address in a different cycle as a cycle in which the access command is received.

16. An apparatus, comprising:

a memory array;

a mode register configured to identify whether a received address that is within a protected region is protected;

a protected region register configured to store addresses defining the protected region of the memory array;

an access count register to store an access count;

a key register configured to store a second key used to determine whether access commands are allowed access to the protected region; and control circuitry configured to:

determine whether the received address is in the protected region of the memory array;

responsive to determining that the received address is in the protected region, access the mode register to determine whether a first key matches the second key stored in the key register, wherein the first key is provided with the access command;

responsive to determining that the first key matches the second key, determine whether the access count is greater than a threshold;

responsive to determining that the access count is not greater than the threshold, enable a row driver to activate a row, of the memory array, corresponding to the received address and increment the access count; and reset, the access count register responsive to a lapse of time without receiving additional access commands to the protected region.

17. The apparatus of claim 16, wherein the control circuitry is further configured to determine whether the received address is greater than a starting address of the protection region and less than an ending address of the protected region.

18. The apparatus of claim 16, the control circuitry is configured to activate the row by providing a signal to the row driver of the memory array.

19. The apparatus of claim 16, wherein the control circuitry is further configured to:

receive an access command;

responsive to receiving the access command, determine whether the first key corresponding to the access command matches the second key; and responsive to determining that the first key matches the second key, store a value representing a matching between the first key and the second key in the mode register.

20. The apparatus of claim 19, wherein the control circuitry is further configured to, responsive to determining that the first key does not match the second key, store a different value, representing that there is no match, in the mode register.

* * * * *